United States Patent Office 2,985,603
Patented May 23, 1961

2,985,603
ALKYD RESIN UTILIZING TRIMELLITIC ANHYDRIDE AND TALL OIL

Richard E. Van Strien, Griffith, and Benjamin A. Bolton, Gary, Ind., assignors to Standard Oil Company, Chicago, Ill., a corporation of Indiana No Drawing. Filed Sept. 12, 1958, Ser. No. 760,555

8 Claims. (Cl. 260—22)

This invention relates to oil-modified alkyd resins from tricarboxylic acid, rosin, and tall oil.

An object of the invention is an oil-modified alkyd resin of good hardness and low embrittlement. A particular object is long oil alkyd resin utilizing a tricarboxylic acid and cheap tall oil. Other objects will become apparent in the course of the detailed description of the invention.

The alkyd resin of the invention is derived from the alkyd resin reaction of a polyhydric alcohol containing at least 3 hydroxyl groups with tall oil fatty acids, rosin and a benzene tricarboxylic acid or one of the anhydrides of these acids. Sufficient tall oil fatty acid and rosin charged to have a resin reaction product having an oil-length in excess of about 77%.

The polyhydric alcohol utilized in the preparation of the composition of the invention contains at least 3 hydroxyl groups. Any of the polyhydric alcohols conventionally used in the preparation of oil-modified alkyd resins may be utilized herein. Examples of suitable polyhydric alcohols are glycerol, trimethylol ethane, pentaerythritol, dipentaerythritol, sorbitol and mannitol; pentaerythritol is preferred.

The tribasic acid utilized in preparing the composition may be either trimesic, trimellitic and hemimellitic or the anhydrides trimellitic and hemimellitic. It is preferred to use either trimellitic acid or trimellitic anhydride. The defined acid or anhydride is usually charged to the reaction zone in an amount of from about 5 to about 30 weight percent of the total reaction charge, i.e. the sum of the alcohol, fatty acids, rosin, and tribasic acid.

The "oil-affording materials" are tall oil fatty acids and rosin. The tall oil fatty acids are the product of distillation of crude tall oil and normally contain essentially only fatty acids such as oleic and linoleic and have a rosin content of 1–3 weight percent. The rosin reactant may be modified or unmodified material. It may be a gum rosin, wood rosin, or tall oil rosin. Also the material may be derived as a mixture from crude tall oil; for example, a commercial grade containing about 70% of fatty acid and about 30% of rosin. In general, the rosin is present in an amount between about 15 and 100 weight percent based on the tall oil fatty acid used; more usually the rosin is present in an amount between about 25% and 55%.

The composition of the invention is the polycondensation reaction product of the ester product of the defined alcohol, the tall oil fatty acids, and the rosin with the defined tribasic acid. In general, all the alcohol and all of the fatty acid are first mixed together and reacted to produce the ester. More alcohol is utilized than is needed stoichiometrically in the reaction. This excess of alcohol amounts to from about 5 to about 20 mole percent over the theoretical requirement. When operating with the preferred amount of tribasic acid and pentaerythritol as the alcohol, it is preferred to charge about 10 mole percent excess alcohol.

The alkyd resin of the invention contains an amount of tall oil fatty acid and rosin calculated as oil such that the reaction product calculates to contain in excess of about 77% oil. It is preferred to maximize the oil content, consistent with the surface coating requirements desired.

Any of the numerous conventional procedures for the preparation of oil-modified alkyd resins may be utilized. In general, the desired amount of the fatty acid, rosin, and the alcohol are charged to a reaction vessel and are heated to a temperature on the order of 180° C. to 285° C., the higher temperatures being utilized with the higher boiling point alcohols.

When the ester product has been formed, the desired tribasic acid is added and reaction carried out at either the same temperature as the ester reaction or preferably at a somewhat higher temperature. The acid may be charged all at once or gradually over a period of time. The reaction is continued in an inert atmosphere while removing water of reaction until the desired acid number and viscosity of the reaction product is reached.

Particularly good results are obtained by using, on a weight basis, per part of polyol charged between about 1.4 and 3 parts of tribasic group affording material and between about 4 and 30 parts of oil affording material, and the reaction is continued until the acid number of the resin is between about 2 and 15. Under these conditions, the viscosity of the resin is more than suitable for use in surface-coating applications when diluted with liquid hydrocarbons, such as mineral spirits, or varnish makers' naptha, or other organic solvents.

The composition obtainable from the defined reactants is illustrated by the following example; for comparison an ordinary tall oil resin and a commercial phthalic resin are shown.

In these alkyd resins, the oil affording reactant and the polyol were charged to a flask equipped with a motor driven stirrer, a thermometer and a reflux condenser. Provision was made to maintain a nitrogen atmosphere in the flask. The reaction was continued for one hour. At this point, trimellitic anhydride was added and the reaction continued for 6 hours at 260° C.

Composition No. 1 was made using a commercial tall oil containing 30% of rosin and the remainder fatty acid. Composition No. 2 was made using commercial tall oil fatty acids containing 1% of rosin. Both compositions were made with commercial pentaerythritol and trimellitic anhydride. The alcohol was used in 10% excess and the oil-length was adjusted to 85%.

In the table the acid number (mg. KOH/gram) was determined on the solid resin product. The viscosity and color was taken on a solution in mineral spirits containing 70% solids by weight. The other results were obtained following standard procedures. The commercial resin used for comparison was selected because of its general acceptance as to drying rate and hardness of the air-dried film.

Table

| | Composition No. 1 | Composition No. 2 | Commercial |
|---|---|---|---|
| Acid Number | 8.6 | 3.0 | |
| Solids, percent | 70 | 70 | |
| Viscosity, Gardner | Z–3 | T–U | |
| Color, Gardner | 8–9 | 8 | |
| Drying Rate—Hrs.:Minutes— | | | |
| Set to Touch | 1–2 | 0:20 | 1–2 |
| Cotton Free | 3–4 | 0:50 | 2–3 |
| Kraft Paper Free | 4–6 | 2:00 | 3–4 |
| Hardness, Sward: | | | |
| 1 day | 17 | 2 | 4 |
| 2 days | 22 | 2 | |
| 7 days | 26 | 2 | 30 |

The data show the improvement in hardness by having rosin present with the fatty acid. The drying rate of the composition of the invention is comparable to that of the commercial material. The very impressive hardness developed in only 1 day, as compared with the commercial, is of great advantage, since the idle time of the painted surface is cut very drastically.

Thus having described the invention, what is claimed is:

1. A very long oil length alkyd resin reaction product of (A), (i) a polyhydric alcohol containing at least three hydroxyl groups, (ii) tall oil fatty acids and (iii) rosin, said rosin being present in an amount between about 15 and 100 weight percent based on said tall oil fatty acids, said alcohol being charged in an amount between about 5 to 20 mole percent in excess of the theoretical requirement to form the ester product of reactants (i), (ii) and (iii), with (B) an acidic material selected from the class consisting of trimellitic acid, trimesic acid, hemimellitic acid, trimellitic anhydride, and hemimellitic anhydride, said acidic material being charged in an amount between about 1.4 and 3 parts by weight per part of said alcohol charged, the ester product of step A and said acidic member being condensation reacted with continuous removal of water at a temperature between about 180° C. and 285° C. until the acid number of the resin reaction product is between about 2 and 15, said resin reaction product being further characterized by an oil-length in excess of about 77%.

2. The resin of claim 1 wherein said alcohol and said member are charged in a weight ratio between about 4 and 30 parts of said member per part of said alcohol.

3. The resin of claim 1 wherein said alcohol is pentaerythritol.

4. The resin of claim 1 wherein said acidic material is trimellitic acid.

5. The resin of claim 1 wherein said acidic material is trimellitic anhydride.

6. A composition consisting essentially of the resin of claim 1 dissolved in an organic solvent.

7. The composition of claim 6 wherein said solvent is mineral spirits.

8. An oil-modified alkyd resin consisting of the polycondensation reaction product of (I) an ester product formed from (a) pentaerythritol and (b) tall oil containing on the order of 30% of rosin wherein the alcohol is present in about 10% excess over the theoretical requirement and (II) trimellitic anhydride in an amount such that the final resin has an oil length on the order of 85%, said ester product and said anhydride being condensed in an inert atmosphere at a temperature of between about 250° and 275° C. until the acid number of the resin product is about 8.

References Cited in the file of this patent

UNITED STATES PATENTS

| | | |
|---|---|---|
| 2,048,778 | Brubaker et al. | July 28, 1936 |
| 2,197,855 | Ellis | Apr. 23, 1940 |
| 2,856,374 | Bolton | Oct. 14, 1958 |
| 2,870,102 | Van Strien | Jan. 20, 1959 |

FOREIGN PATENTS

| | | |
|---|---|---|
| 881,823 | France | Feb. 4, 1943 |
| 680,996 | Great Britain | Oct. 15, 1952 |